United States Patent Office 3,507,526
Patented Apr. 21, 1970

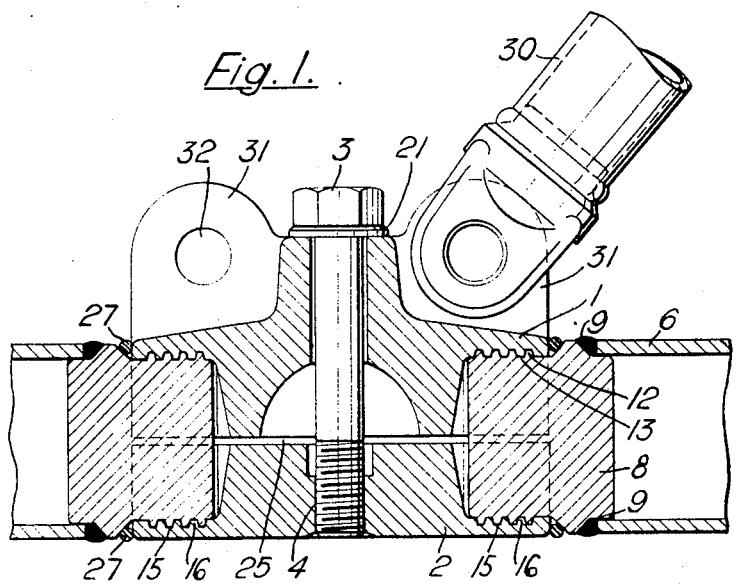
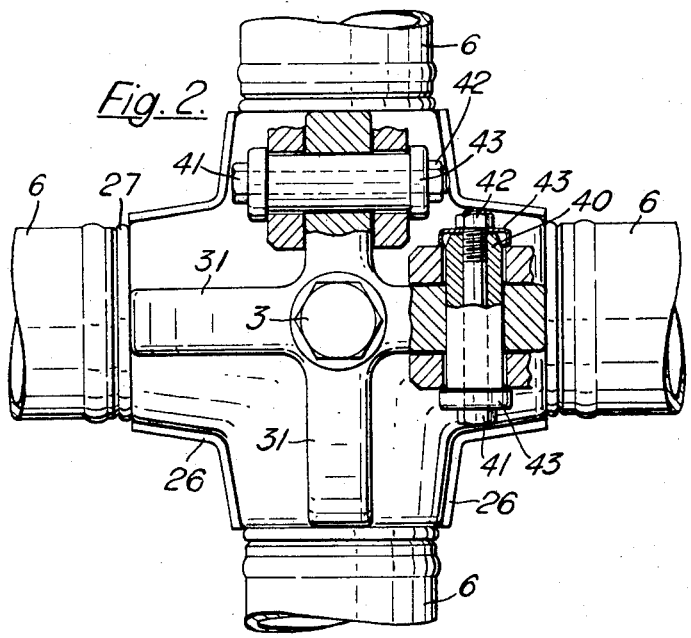

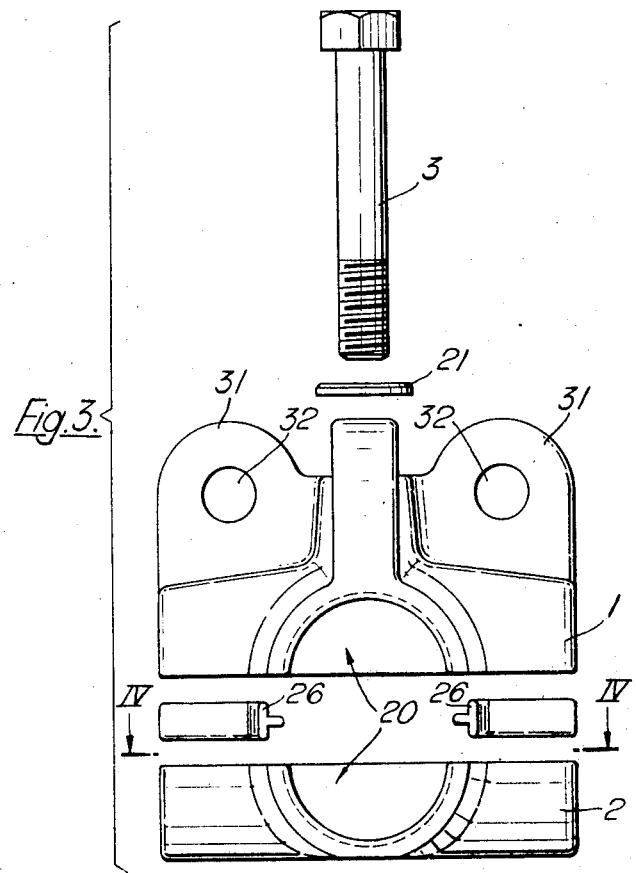
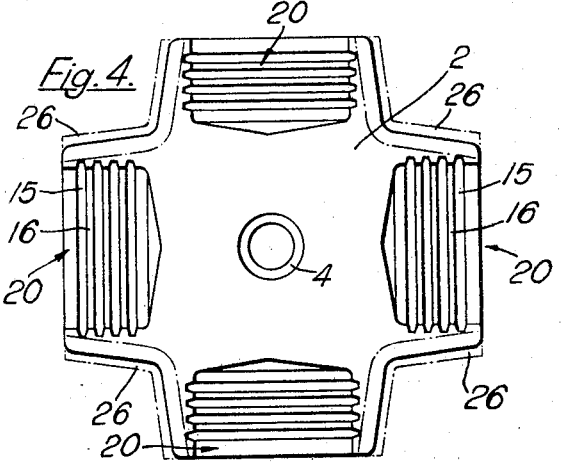

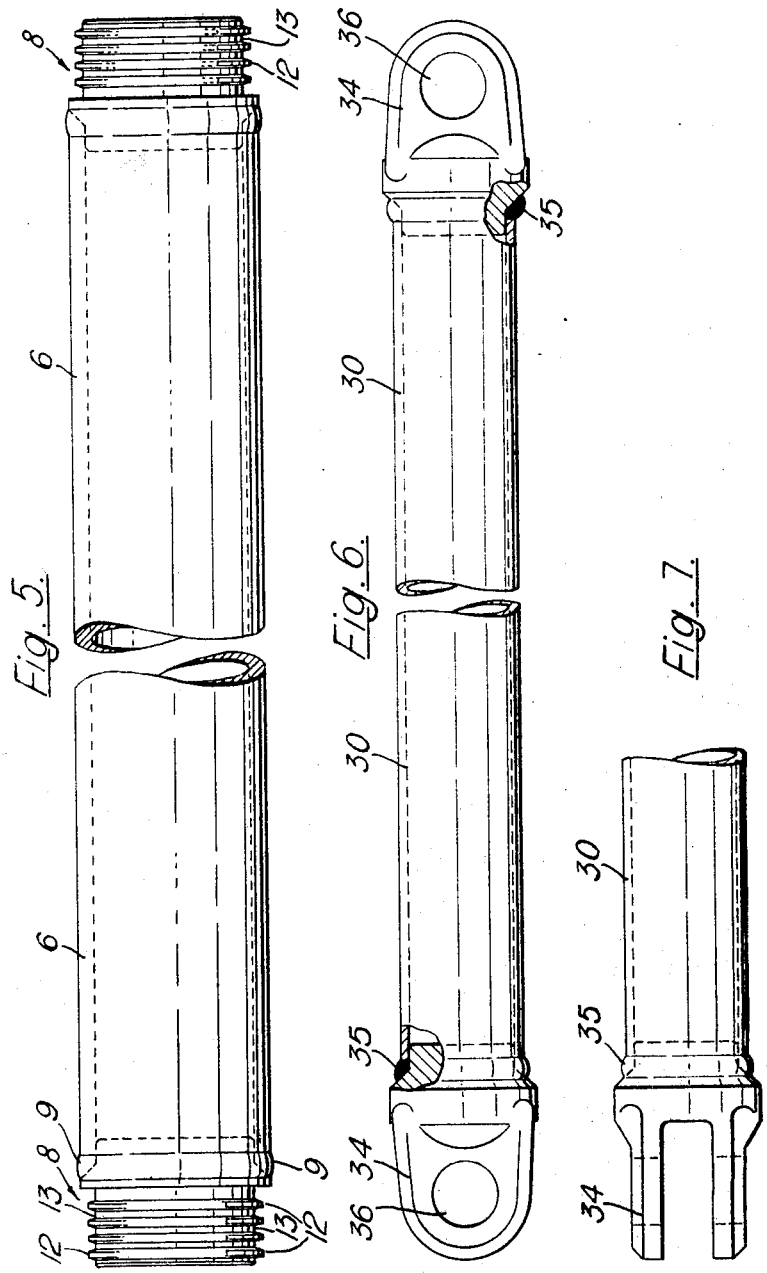

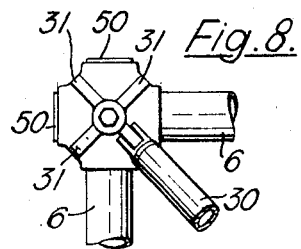
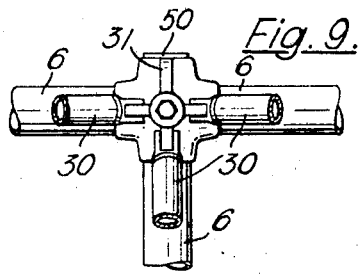
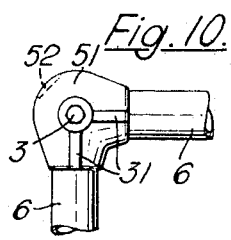
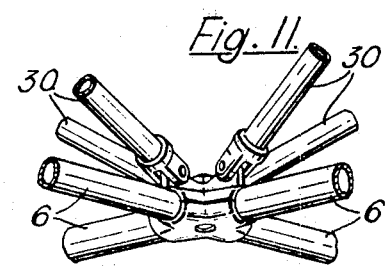
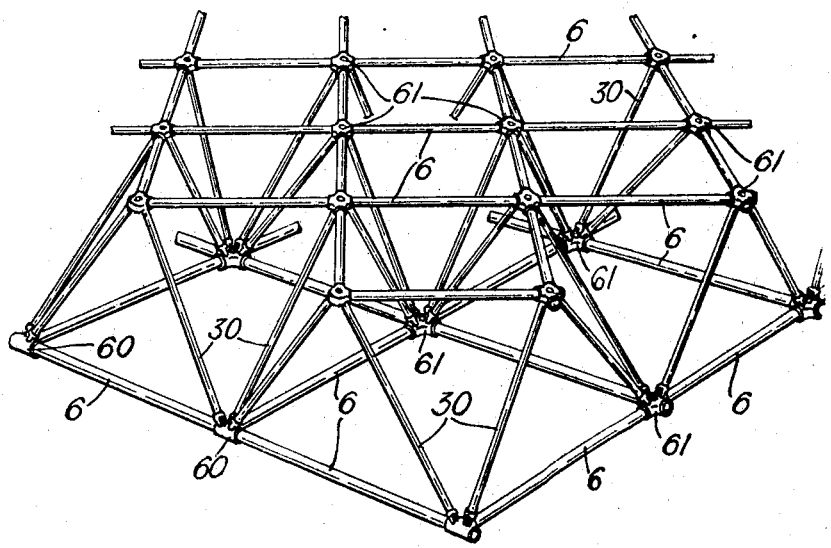

3,507,526
TUBULAR STRUCTURES
Percival James Packman, Twyford, and Hubert Beresford Walker, East Barnet, England, assignors to Stewarts and Lloyds Limited, Glasgow, Scotland
Filed Dec. 4, 1967, Ser. No. 687,825
Claims priority, application Great Britain, Dec. 9, 1966, 55,326/66
Int. Cl. F16b 7/00
U.S. Cl. 287—54                               10 Claims

ABSTRACT OF THE DISCLOSURE

A joint between tubular members lying substantially in a common plane in a tubular steel space structure is made by means of a pair of clamping elements which are held together by a bolt or bolts and between them define sockets formed with alternating transverse recesses and projections for the reception of the complementarily shaped ends of the tubular members.

---

The invention relates to two-dimensional or three-dimensional tubular steel building structures, sometimes known as space frames. Structures of this kind are of particular importance in the construction of fabricated roofs, domes and so forth, which are made in a single, double or even multilayer framework. In such structure the tubular members come together at intervals at common points where they need to be joined together. A junction of three members represents the simplest form of joint but a joint involving a larger number of members is quite common. Although tubular members may reach the joint from different angles in different planes a relatively large proportion of the joints involved are between main members lying in a common plane (or a slightly distorted plane in the case of barrel vaults and domes) in combination with bracing members which either run at an angle with the main members and in a transverse plane which extends on one side of the plane of the main members or in a transverse plane which has been rotated about the centre of the joint. It is with joints of this type that the present invention is concerned.

According to the present invention such a joint is made by means of a jointing member comprising a pair of clamping elements which between them define sockets for the reception of the ends of the tubular members to be connected and means for pressing these two elements together so that the opposing sides of each socket can grip the end portion of a respective tubular member, the opposing sides of each socket being formed with a transverse recess or projection for cooperation with a complementary configuration on the end of the tubular member. For example, each side of the socket may be formed with a transverse projection which is a close fit with a corresponding recess in the end portion of the tubular member so that the pressure exerted between the clamping elements forces the projections into the recesses and thus holds the member securely in position.

A joint formed in this way is able to withstand tensile and compressive loading as the result of the reaction between the engaging sides of the projections and recesses. It is also able to withstand non-axial loads which cause a bending effect on the end of the tubular member as a result of a reaction in the opposite direction between opposite pairs of projections and recesses. For this purpose it is important that the pairs of projections and recesses should lie on opposite sides of the neutral axis of the load carrying member. Since the engaging faces have lanes of resistance which are substantially at right angles to the line of force in the members, the joint has the important advantage that the load between the members joined is transmitted through the material of the joint itself. In addition to its ability to withstand any loads which are likely to be applied the joint is particularly easy to assemble since it requires no welding at all on the site.

The clamping elements are preferably pressed together by a central bolt, screw or stud which in use is slackened off so as to separate the elements sufficiently for insertion of the ends of the tubular members and then tightened up again so as to grip the ends of the members and thus complete the joint. In some circumstances, however, it may be more convenient to use more than one such bolt, screw or stud.

The end portions of the tubular members are most conveniently circular in cross-section with the transverse recess or projection extending round the periphery of the circle. The sockets defined between the clamping elements then need to be of a corresponding circular shape so as to accommodate such end portions. The shape of the end portions need not necessarily correspond to that of the tubular members themselves. For example, the end portions may be circular as just mentioned while the tubular members themselves may be either circular or square or rectangular in cross-section. Yet again the end portions may be square or rectangular in cross-section, in which case the shape of the sockets between the clamping elements needs to correspond. Generally speaking the end portions of the tubular members may be solid forgings which are welded to the ends of the respective tubular members but in some cases the necessary shaping may be applied directly to the end of the tubular member itself, for example, by means of a rolling operation. Any initial preparation of the ends of the tubular members whether by welding or rolling or otherwise is, of course, carried out in the shop rather than on the site so that when the members have been transported to the site the only further operation which is necessary is the completion of the various joints as already described.

The engagement between the ends of the tubular members and the respective sockets is made by the inter-fitting of the transverse recesses or projections and in order to ensure a close fit when the clamping elements are tightened up both the projection and the corresponding recess are preferably formed with a slight taper. Still more positive engagement with more even distribution of the forces involved is provided by the provision of alternating recesses and projections both on the surface of the socket and on the end portion of the tubular member. The use of multiple projections and recesses enables each to be made considerably shallower than if only a single projection or recess were to be used. This assists the machining of the ends of the tubular members and also enables a reduced thickness to be used for the clamping elements.

In order to avoid excessive bending moment on the jointing member itself the sockets are preferably so aligned that their axes, and hence the axes of the tubular members to be fitted into the sockets, pass substantially through a common point. The resultant of the various axial forces in the different tubular members then produces no appreciable bending moment in the jointing member. The tubular members held by the sockets all constitute the "main members" referred to originally. Some joints may consist only of such main members and others may include bracing members extending out of the plane of the main members. These bracing members are not subject to such high loading as the main members and may be attached in position more simply. For this purpose one of the clamping elements may include securing lugs. Either the lug or the end of the bracing member may be forked so that one fits within the other and the whole may be secured together by a bolt or pin passing through holes in the respective parts.

These securing lugs inevitably project beyond the common plane through the main members fitted in the sockets but the other clamping element may be so shaped that neither it nor the securing bolt or stud projects to any appreciable extent beyond a plane through the extreme points of the surfaces of the main members, i.e. a plane which is tangential to these members if they are of circular cross-section. Such a design of joint is facilitated by the reduced thickness of clamping member which is made possible by the use of multiple projections and recesses, as already described. With such a design a substantially flush surface is provided, over which it is possible to extend any cladding quite smoothly to cover the joint. This is a considerable advantage over other forms of joint which extend beyond the plane just referred to and thus necessitate specially shaped portions of cladding to accommodate them, or the provision of costly additions.

Construction of joint in accordance with the invention will now be described in more detail by way of example with reference to the accompanying drawings in which:

FIGURE 1 is a cross-sectional view of a joint seen in elevation;

FIGURE 2 is a plan view of the joint seen in FIGURE 1 with parts seen in cross-section;

FIGURE 3 is an exploded view showing the components of the jointing member used in the joint of FIGURES 1 and 2;

FIGURE 4 is a plan view showing a lower clamping element as seen along the line IV—IV in FIGURE 3;

FIGURE 5 is an elevation of a main tubular member used in the joint of FIGURES 1 and 2;

FIGURE 6 is an elevation of a bracing member used in the same joint;

FIGURE 7 is a view of the end of the member shown in FIGURE 6 seen in a direction at right-angles;

FIGURES 8, 9 and 10 are views to a reduced scale of modified forms of the joint shown in FIGURES 1 and 2;

FIGURE 11 is a perspective view from beneath of a complete joint similar to that shown in FIGURES 1 and 2; and FIGURE 12 is a perspective view of a two-layer space frame including joints shown in the earlier figures.

The joint shown in FIGURES 1 and 2 is made between an upper and a lower clamping element 1 and 2 respectively. These are pressed together by means of a bolt 3 screwed into a threaded socket 4 in the lower element 2. Both elements are shaped to define sockets for the reception of four main tubular members 6 as seen in FIGURE 2. As previously described these main members lie substantially in a common plane and the sockets are so aligned that the axes of the members 6 pass substantially through a common point at the centre of the joint so as to avoid the establishment of any appreciable bending moments.

In the example shown the tubular members 6 and their end portions 8 are circular in cross section and the sockets are shaped accordingly. Each end portion 8 is made as a separate forging which as best seen from FIGURE 1 is welded at 9 to the end of the tubular member 6. This welding operation is carried out in the shop so that no welding equipment is required at the site. Each end portion 8 is formed with alternating projections 12 in the form of ribs extending around the circular periphery of the end portion and alternating with recesses 13. Apart from their primary function, the projections 12 may be fitted into an appropriate jig while the end portions 8 are being welded to a member 6 so as to ensure a high degree of accuracy in the overall length of the member including its end portions.

Each socket is formed with recesses 15 for the reception of the ribs 12 and with intervening projections 16 which fit into the recesses 13. As can be seen from the drawings the ribs and recesses are all formed with a slight taper so that when pressure is exerted by means of the bolt 3 a tight fit is obtained. Owing to the fact that the projections and recesses lie on opposite sides of the neutral axis of each tubular member 6 the joint is able to withstand non-axial loads as previously described. Such a result could be obtained by the provision of only a single projection on one part and a corresponding recess on the other but the alternating projections and recesses illustrated are preferred for the reasons stated previously.

FIGURE 4 which shows only the lower clamping element 2 provides the best illustration of the shaping of the sockets which are indicated as 20. For the purposes of assembly the elements 1 and 2 are separated as shown in FIGURE 3, the end portions 8 of the member 6 are inserted in the sockets and the joint is then completed by means of the bolt 3 which is provided with a washer 21. When the bolt 3 has been tightened up there will inevitably still be a small gap between the elements 1 and 2 which is shown in FIGURE 1 as 25. In order to keep out moisture which might otherwise cause rusting of the components, sealing members 26 seen best in FIGURE 3 but shown also in dotted lines in FIGURE 4 are fitted into the spaces between the elements 1 and 2 lying between the respective sockets 20. Small O-rings 27 seen in FIGURES 1 and 2 are also fitted round the end portions 8 so as to seal the gap between the end portion and the face of each socket 20.

In addition to the main member 6 the majority of joints will also require to accommodate bracing members one of which is shown in FIGURE 1 as 30. For this purpose the upper clamping element 1 is formed with four lugs 31 which in this example are in direct line with the sockets 20. Each lug 31 is formed with a hole 32 and each bracing member 30 is formed with a forked end portion 34 best seen in FIGURE 7. As seen from FIGURE 6 the members 30 are tubular and are similar to the main members 6 except that they are of smaller bore and lighter construction. The forked end portions 34 are fabricated separately and are each held in position by means of a weld 35 which, of course, is carried out in the shop. Each end portion 34 is formed with a hole 36 which when assembled is brought into register with the hole 32 in the respective lug 31 and is held in position as illustrated in FIGURE 2. For this purpose a sleeve 40 is fitted through the registering holes 32 and 36 and a bolt 41 is fitted through the centre of the sleeve and is held in position by a nut 42. Cupped washers 43 are fitted beneath the head of the bolt 41 and the nut 42 and the combination of sleeve, bolt and washers is the equivalent of a pin. In addition the washers 43 serve to exclude moisture from the spaces within the connection just described.

Bracing members 30 may be fitted to some or all of the lugs 31 in accordance with the requirements of the particular joint. FIGURE 11 is a perspective view of a complete joint made by means of the components just described and including four main members 6 and four bracing members 30. The main members 6 all lie in a common plane and the bracing members 30 project above this plane. It will be seen that no parts of the joint project to any appreciable extent below the plane which is tangential to the members 6 and the joint thus presents a relatively smooth flush lower surface to which cladding can be fitted without difficulty.

Not all joints will need to be made between four main members and four bracing members. In some cases on the edge of a structure only three main members will need to be joined as shown in FIGURE 9, while at a corner only two members will need to be joined as shown in FIGURE 10. The clamping elements shown in FIGURES 1 to 4 can, however, still be used, the vacant sockets being filled by means of blanking pieces similar to the end portions 8, not attached to any tubular member. In FIGURE 8 two main members 6 are illustrated while blanking members 50 occupy the remaining two sockets. Only a single bracing member 30 is shown, the remaining three lugs 31 being left vacant. It will be seen that in this view the lugs 31 are rotated in respect to the sockets so that the bracing member 30 extends at an angle of 45° to the main member 6 when seen in plan. This is generally necessary when the main members of two adjacent layers of a structure are to run parallel.

In the view of FIGURE 9 there are three main members 6 and one blanking member 50 so as to form a T-joint. In this case the lugs 31 are in line with the sockets as shown in FIGURES 1 and 2 and three of these lugs are connected to bracing members 30. Instead of using blanking members 50 it is equally possible for the joining member to be designed specifically for a similar number of main members as illustrated in FIGURE 10, which shows a corner joint for two main members 6. The jointing member itself is shown as 51 and the two clamping elements constituting the jointing member are again held together by a bolt 3. In order to equalise the pressures on the sockets holding the two members 6 a projection is formed on one of the clamping elements so as to extend into engagement with the other element as shown in dotted lines at 52. A similar jointing member can be constructed so as to form the T-joint of FIGURE 9 without the need for a blanking member 50 and indeed jointing members can be constructed to accommodate any required number of main pieces 6.

The joint in accordance with the invention is thus extremely versatile in that it can accommodate any required number of main members or bracing members and it is merely a question of selecting an appropriate jointing member. The tubular members themselves are standard and any processes of fabrication are carried out in the shop so that assembly on the site is restricted merely to fitting the ends of the tubular members into the jointing member and then tightening a bolt to complete the joint.

FIGURE 12 shows a two-layer space frame using various of the types of joint previously described and illustrated. The lower layer comprises main members 6 which are joined together by means of jointing members in accordance with the invention. At the edges the joints shown as 60 each correspond to those illustrated in FIGURE 9 except that they are specially designed for the purpose and do not include the blanking members 50. No corner is illustrated but such a corner would be constituted by means of a joint 51 as shown in FIGURE 10. The remaining joints shown as 61 are all in accordance with FIGURES 1 to 4 and connect together four main members 6 and four bracing members 30. These bracing members are in line with the main members 6 and as a consequence the main members of the upper layer run at 45° to those in the lower layer. The joints in the upper layer are again shown as 61 and connect together four somewhat shorter main members 6 and four downwardly extending bracing members 30. It will be seen that in the lower layer each joint is flush on its lower side so as to permit the fitting of cladding which may, for example, constitute the ceiling of a room below, while in the upper layer it is the upper surface which is flush and which again permits the fitting of cladding as previously described.

We claim:

1. A jointing member comprising a pair of clamping elements, each shaped to define between them sockets for the reception of the ends of tubular members to be connected by said jointing member, said tubular members lying substantially in the same plane, each tubular member having connected thereto an end portion of reduced circular cross-section relative to the remainder of the tubular member, means defining on each of said end portions a plurality of first recesses and projections extending transversly to the axis of the respective tubular member, means defining in each of said sockets a plurality of recesses and projections extending transversly to the axis of the respective sockets and shaped for engagement with said first recesses and projections, means for pressing said clamping elements together into clamping engagement with said end portions, such that said first and second recesses and projections mutually inter-engage and retain said end portions in said sockets, one side of the said non-reduced remainder of each tubular member and one side of one of said clamping elements lying in a substantially common plane, at which common plane cladding or the like may be attached to the jointing member and the tubes, and wherein the clamping member is shaped such that it does not project appreciably beyond the said substantially common plane.

2. A jointing member according to claim 1 in which said pressing means is a central bolt.

3. A jointing member according to claim 1 in which said recesses and projections are formed with a taper.

4. A jointing member according to claim 1 in which said sockets are so aligned that their axes pass substantially through a common point.

5. A jointing member according to claim 1 in which one of said clamping elements includes securing lugs for bracing members.

6. A jointing member according to claim 1 and including a resilient seal for closing spaces between said elements and lying between adjacent sockets.

7. A tubular space structure comprising a plurality of elongated tubular members secured together by jointing members as set forth in claim 1.

8. A tubular space structure according to claim 7, wherein said end portions each comprise a shaped member of circular cross-section secured at the end of the respective tubular member.

9. A tubular space structure according to claim 8, wherein said shaped member is solid.

10. A tubular space structure according to claim 8, wherein said shaped member protrudes inwardly of the respective tubular member.

References Cited

UNITED STATES PATENTS

| 998,904 | 7/1911 | Jacobs. |
| 2,067,271 | 1/1937 | Johnson et al. _____ 287—111 |
| 2,958,546 | 11/1960 | Lee _____ 285—373 XR |
| 2,985,435 | 5/1961 | Gross _____ 285—373 XR |

FOREIGN PATENTS

| 672,764 | 5/1952 | Great Britain. |
| 509,877 | 1/1955 | Italy. |
| 947,034 | 8/1956 | Germany. |
| 1,442,413 | 5/1966 | France. |

DAVID J. WILLIAMOWSKY, Primary Examiner

A. KUNDRAT, Assistant Examiner

U.S. Cl. X.R.

52—655